July 30, 1968 A. STEIER ET AL 3,394,945
ANTI-THEFT DEVICE FOR SHOPPING CARTS
Filed Jan. 6, 1966 4 Sheets-Sheet 1
FIG.1
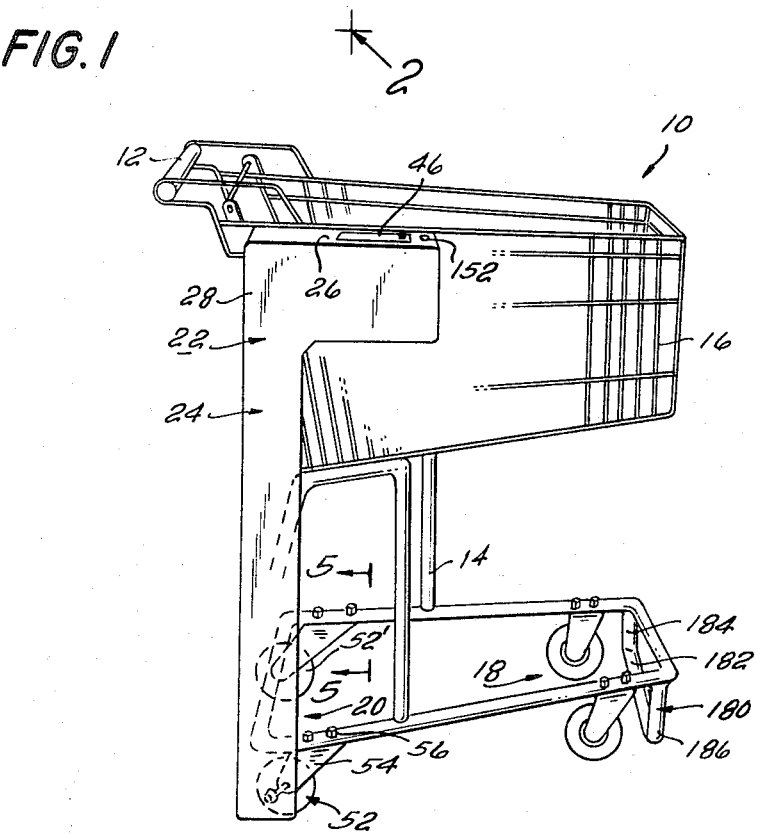
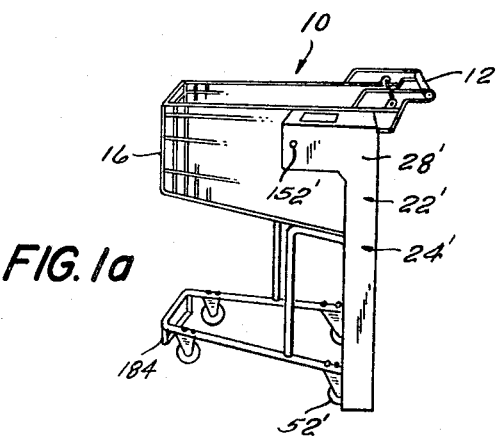
FIG.1a
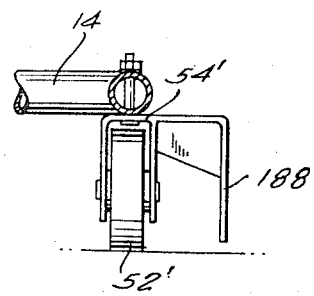
FIG. 5
INVENTORS
ANSHEL STEIER
DAVID STEIER
MEYER STEIER
BY Kirschstein, Kirschstein & Ottinger
ATTORNEYS

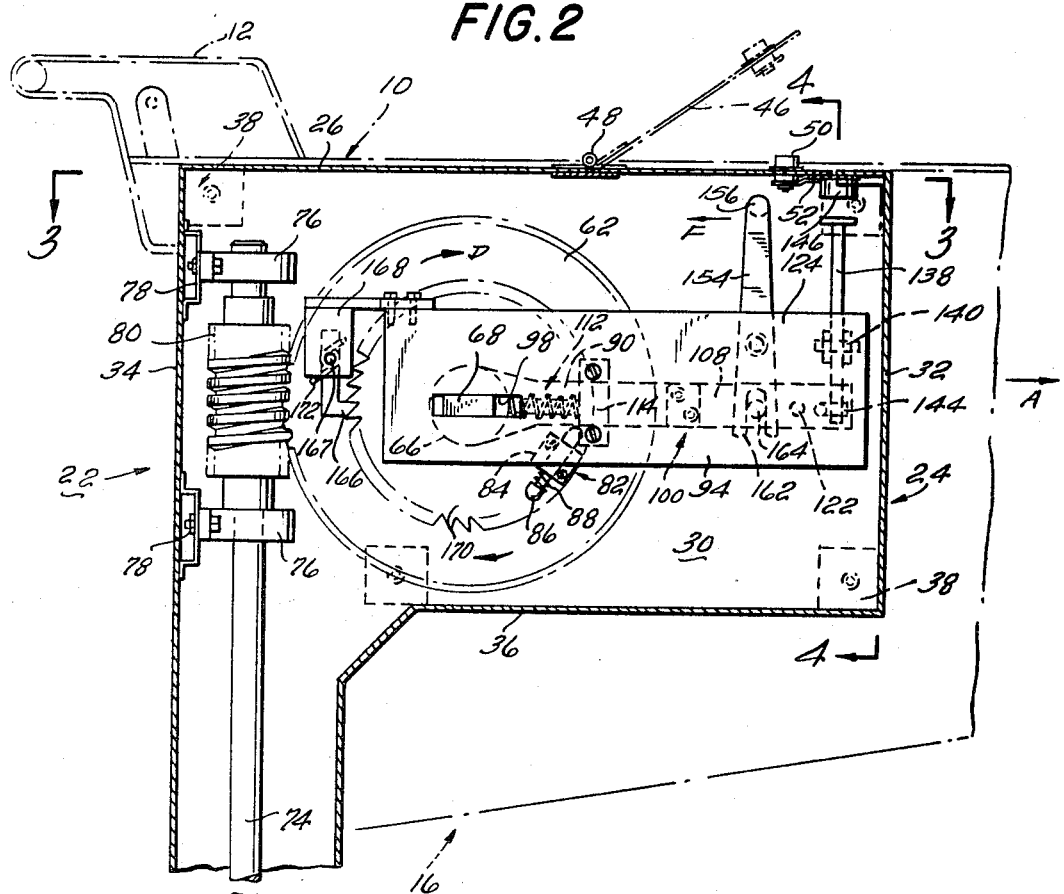

July 30, 1968  A. STEIER ET AL  3,394,945
ANTI-THEFT DEVICE FOR SHOPPING CARTS
Filed Jan. 6, 1966  4 Sheets-Sheet 3

INVENTORS
ANSHEL STEIER
DAVID STEIER
MEYER STEIER
BY
Kirschstein, Kirschstein & Ollinger
ATTORNEYS July 30, 1968 A. STEIER ET AL 3,394,945
ANTI-THEFT DEVICE FOR SHOPPING CARTS
Filed Jan. 6, 1966 4 Sheets-Sheet 4

INVENTORS
ANSHEL STEIER
DAVID STEIER
MEYER STEIER
BY
ATTORNEYS

United States Patent Office 3,394,945
Patented July 30, 1968

3,394,945
ANTI-THEFT DEVICE FOR SHOPPING CARTS
Anshel Steier, David Steier, and Meyer Steier, Brooklyn, N.Y. (all % Hickory Smoked Cheese Corp., 41 Harrison St., New York, N.Y. 10013)
Filed Jan. 6, 1966, Ser. No. 519,111
18 Claims. (Cl. 280—33.99)

ABSTRACT OF THE DISCLOSURE

For a shopping cart including a frame, a basket fixed to the frame and roll-about wheels mounted on the frame, an anti-theft device comprising transmission reduction means operatively driven by a wheel of the cart and driving a member in a single direction through a predetermined path of travel, a stop in the path of travel of the movable member, which, when contacted by said member, blocks said member from further movement and thereby prevents further movement of the cart, mechanical means to prevent the member from moving in a direction corresponding to reverse movement of the cart, and a clutch selectively disengaging the transmission means to convert the anti-theft device to a free-wheeling distance-unlimited mode.

---

This invention relates to an anti-theft device for a shopping cart.

It is the primary object of this invention to provide a device which will discourage and prevent wheelaway removal and theft of shopping carts from supermarkets, shopping centers and other retail store buildings in which shopping carts are conventionally used.

It is another object of this invention to provide for a shopping cart an anti-theft device of the character described which is mounted on the cart, which does not interfere with the normal operation and use of the cart while the same is within a prescribed area, to wit, within the supermarket shopping area, and which can be easily set into operation at a certain location, e.g. the check out zone, so that it prevents the cart from thereafter being rolled beyond a predetermined distance whereby the cart may be wheeled from the supermarket building into the parking lot by the shopper to enable him to transfer his groceries from the shopping cart to his automobile, but no further distance.

It is another object of this invention to provide for a shopping cart an anti-theft device of the character described which has a free-wheeling mode so that it does not interfere with the rolling of the cart within the supermarket, and which can be easily and quickly manipulated by a clerk at a check out counter in the supermarket to connect the same to a one-way limited distance traversing mode.

It is still a further object of this invention to provide for a shopping cart an anti-theft device of the character described which, although it can be easily and quickly converted by a supermarket clerk to its one-way limited distance traversing mode, is yet tamper-resistant so that one attempting to steal a shopping cart cannot easily de-activate the anti-theft device.

It is an ancillary object of this invention to provide for a shopping cart an anti-theft device of the character described which is attached to the cart in a fashion such as to be visible and exposed so that its presence is a warning that some sort of anti-theft protection is present, yet which is so located on the cart that it does not prevent the nesting of carts within the supermarket.

It is a further object of this invention to provide for a shopping cart an anti-theft device of the character described which, upon activation (conversion to its second mode), limits the travel of the shopping cart to a predetermined distance by preventing the rotation of the shopping cart wheels, and which includes a cushioned stop so that as the shopping cart reaches the end of its permissive movement, movement of the cart is gradually stopped so that the cart does not halt so abruptly as to possibly harm a shopper.

It is a further object of this invention to provide for a shopping cart an anti-theft device of the character described which optimally includes a mechanism for automatically resetting the device to the beginning of a fresh limited distance traversing cycle so that the resetting of the device, after one shopper has rolled the cart into a parking lot, has removed his groceries from the cart and placed them into his automobile and finished his use of the cart, can be quickly and easily effected to prepare the cart for use by another shopper.

It is another object of this invention to provide for a shopping cart an anti-theft device of the character described which is simple in construction and relatively few in its number of parts, which can be manufactured by mass production techniques and which is marketable at a reasonably low cost so that the purchase thereof and the mounting of the same on a shopping cart is not economically prohibitive.

Other objects of this invention in part will be obvious and in part will become apparent to the reader in the following description.

The instant invention accordingly consists in the features of construction, combinations of elements and arrangements of parts which will be exemplified in the anti-theft devices for shopping carts hereinafter described and of which the scope of application will be indicated in the appended claims.

In the accompanying drawings in which are shown various possible embodiments of this invention:

FIG. 1 is a side perspective view of a shopping cart with one embodiment of the anti-theft device mounted thereon;

FIG. 1a is a side perspective view of a shopping cart with another embodiment of the anti-theft device mounted thereon;

FIG. 2 is a side vertical cross-sectional view taken substantially along the line 2—2 of FIG. 1;

FIG. 2a is a fragmentary vertical cross-sectional view taken substantially along the line 2a—2a of FIG. 2;

Figure 3:
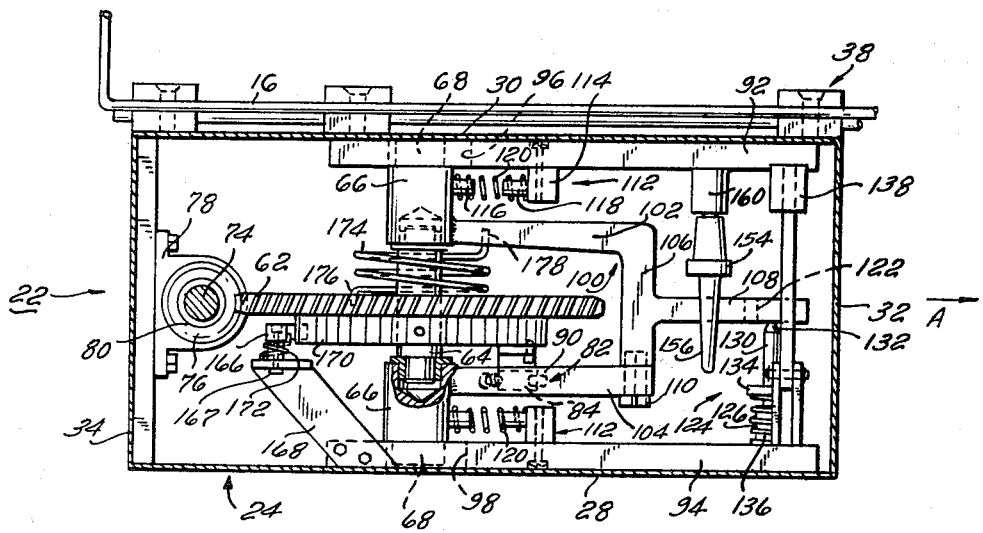
Figure 4:
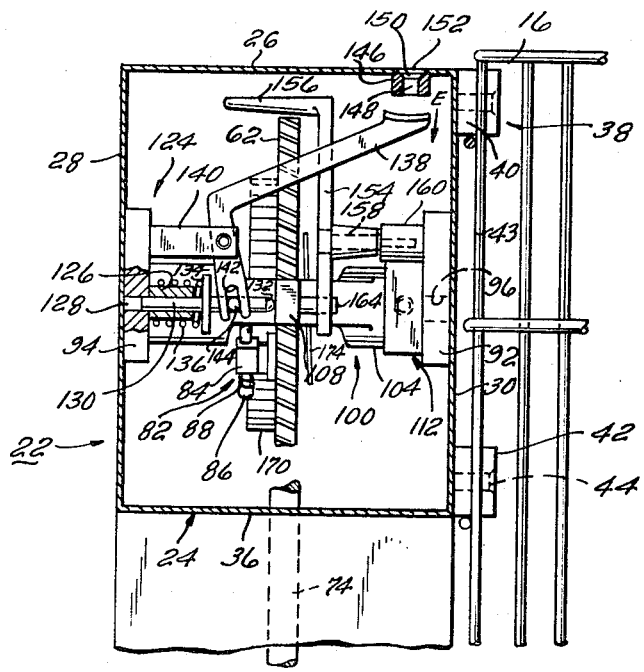
Figure 6:
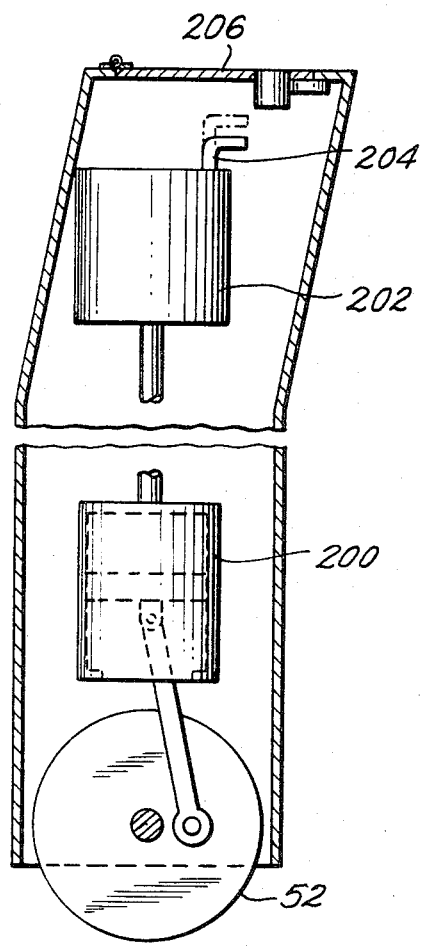

FIGS. 3, 4 and 5 are cross-sectional views taken substantially along the lines, respectively, 3—3 and 4—4 of FIG. 2 and 5—5 of FIG. 1; and FIG. 6 is a fragmentary vertical cross-sectional view similar to FIG. 2 of another embodiment of the invention.

In general, and in accordance with the teaching of the present invention, there is provided a device to inhibit and prevent the wheeled removal or theft of shopping carts from their intended boundary of use. Such shopping carts are of the type commonly provided for the convenience of shoppers at supermarkets, shopping centers, large discount stores and other similar retail locations. The managements of such retail outlets have found that shoppers uniformly enjoy the convenience of having a mobile wheeled container for rolling about the goods which they have chosen from the shelves of their stores, since they need not burden themselves with carrying such goods in their hands. In fact, the provision of such shopping carts is a requisite for the success of large chain food stores.

To properly serve their intended function, the shopping carts must be large, well-made and rugged, and are, consequently, quite costly. Due to their value and due to the desire of some persons to have a mobile carrier in and about their homes to aid them in performing household chores, it is, unfortunately, quite common for these shopping carts to be appropriated by unscrupulous people from their intended boundary of use.

Such thefts have been previously quite easily accomplished because it has been the practice to permit shoppers to roll the shopping carts out of their buildings, after the merchandise carried therein has been paid for. It was intended that the shoppers roll the carts to an adjoining parking lot where the contents might be transferred to the shoppers' automobiles. The carts might then be returned empty to the building or might be left in the lot to be subsequently picked up by a store clerk. Of course, the removal of the carts from the building premises also removed them from the scrutiny of those persons supervising the operation of the outlet.

The new anti-theft device is attached to a shopping cart and, after actuation, permits the cart to be rolled only a certain predetermined distance, after which the device blocks rotation of the wheels of the cart so that no further rolling of the cart is possible. The device includes a housing mounted on the frame of the shopping cart and a rotatable member. Transmission means so kinematically connects a wheel of the cart to the rotatable member that as the cart is rolled, the member is rotated. A blocking member is attached to the rotatable member for common rotation therewith so that the blocking member moves through a predetermined path of travel, the same desirably being closed, i.e., endless. The transmission means includes a motion reducing component so that the blocking member travels at a rate greatly less than the cart. A stop is located in the path of travel of the blocking member to prevent movement of the blocking member and thus the rotatable member beyond a certain point. Thus, after the anti-theft device is actuated, the wheels of the cart can be rolled only a certain limited distance until the blocking member abuts the stop and thereafter no further rolling is possible.

The limited distance is a few feet, e.g. 200 feet, more than the ground distance from the check out counter area to the furthest point in the parking lot.

The anti-theft device further includes means permitting only unidirectional rotation of the rotatable member once the device is actuated so that when the limit of movement of the rotatable member is reached, pulling of the cart backwardly cannot be effectuated. Further, anti-tilt arms on the lower periphery of the cart prevent rolling of the same on less than all wheels to escape the locking effect of the device on the one wheel of the cart which drives the distance measuring and blocking means.

We also provide means to selectively disengage (break) the kinematic connection between the said one wheel and the rotatable member so that at such time the shopping cart is free-wheeling, e.g., the said one wheel is not driving the distance measuring and blocking means. The free-wheeling condition is desirable when the cart is within the retail store so that the shopper can wheel the cart about in the shopping area of the store premises without limitation as to distance.

The aforesaid disengaging means is arranged so that the rotatable member is biased into engagement with a driving member but is held away from engagement by latch means. Said latch means is operable simply, easily and quickly by a store clerk near the store exit, that is, adjacent the check-out counter, if there is such, and operation thereof changes the mode of our device from a free-wheeling mode to a limited distance traversing mode. After the cart wheel is blocked, the device can only be reset by an authorized employee who has a proper key to permit him to gain entry to the internal mechanism of the device.

Referring now in detail to the drawings, in FIG. 1 a conventional shopping cart is denoted by the reference numeral 10 and is of the familiar type utilized in retail outlets for the convenience of customers. The cart includes, as is usual, a handle 12, a tubular metal frame 14 on which the handle is mounted, a large wire basket 16 fixed to an upper portion of the frame and in which merchandise can be carried, and two pairs of wheels attached to the lower periphery of the frame, a forward pair 18 which are swiveledly mounted on the frame and a rearward pair 20 which are stationarily fixed to the frame so that they cannot swivel.

Our anti-theft device is denoted by the reference numeral 22 and includes a generally vertically elongated L-shaped housing 24, preferably of sheet metal, which mounts the other components of our device and which envelops the remainder of the device in order to prevent the hands and feet of shoppers and children, as well as other foreign matter, from entering therein. The housing 24 is of hollow box-like configuration and includes a top wall 26, a right side (exposed) wall 28, a left side wall 30, a front wall 32, a rear wall 34 and a bottom wall 36.

The housing 24 is fixed to one side of and toward the rear of the cart 10 and is so configured and located that the nesting of one shopping cart in another is not impeded. The housing is attached to the cart by several mounting clamps 38, each of which includes one member 40 fixed, as by welding, to the exterior face of the left side wall 30 and which is located on one side of an adjacent stringer 43 of the basket, and each including another member 42 located on the other side of said stringer. A bolt 44 draws the pair of members of each clamp together, firmly gripping the stringer therebetween.

Access is permitted to the interior of the housing by a panel 46 which is rotatably mounted on the top wall 26 by a hinge 48. The panel is normally kept closed over an access opening by a key-operated lock 50 which has a latching tongue 52 that selectively engages the under surface of the top wall.

The anti-theft device 22, according to the instant invention, operates in connection with one of the wheels of the shopping cart, preferably a fixed wheel 52 of the rear pair of wheels 20. Each of said pair of rear wheels (best seen in FIG. 2a) is mounted to the lower periphery of the frame 14 of the shopping cart by a dependent U-shaped bracket 54. The central reach of the bracket is secured to the frame 14 as by a pair of bolts 56.

The selected wheel 52 is rotatably supported between the arms of the bracket 54 on an elongated shaft 58 which passes between the arms and through a central aperture in the wheel 52. The wheel 52 is fast to the shaft 58 for common rotation. The shaft 58 projects substantially beyond one side of the bracket 54, this projection being supported by a bearing 60 fixed on one side of the bracket 54.

The anti-theft device further includes a rotatable member mounted within the housing, said member constituting a large diameter worm wheel 62. The mounting for the worm wheel 62 includes a shaft 64 passing centrally through said wheel and fast to said wheel. The ends of the shaft 64 are rotatably mounted in a pair of non-rotatable opposed bearings 66. The shaft 64, and consequently the wheel 62, rotates about a horizontal axis. Each of the bearings 66 has an end 68 distant from the shaft 64 which is of rectangular transverse cross-section (see FIG. 2).

Transmission means kinematically connects the worm wheel 62 to the rear wheel 52 of the shopping cart so as to be driven thereby. To this end, the projecting end of the wheel shaft 58 is fixed thereto a 45° small diameter bevel gear 70 which meshes with a larger diameter 45° bevel gear 72. A typical ratio between said bevel gears is 4 to 1. The larger bevel gear 72 is fixed on the bottom end of a vertical shaft 74 which is mounted to turn about its longitudinal axis. To this end, the shaft is journalled in a pair of spaced bearings 76 each of which is attached by a bracket 78 to the inside of the rear wall 34 of the housing 24.

Fixed on the shaft 74 between the bearings 76 is a worm gear 80 which is designed to drivingly engage the worm wheel 62. The step-down driving ratio between the worm gear and worm wheel is substantial, a typical ratio being 100 to 1 so that in the example given, the total step-down experienced in the kinematic transmission gear train constituting the two pairs of intermeshing gears, is 400 to 1. Thereby if the diameter of the rear wheel is, exemplificatively, six inches, the cart will roll for slightly over 600 feet for one revolution of the worm wheel.

It may be noted at this point that when the shopping cart is pushed forwardly in the direction indicated by the arrow A of FIG. 2, the shopping cart wheel 52 rotates in the direction indicated by the arrow B, the shaft 74 rotates in the direction indicated by the arrow C, which is translated by the worm gear into rotative movement of the wheel 62 in the direction indicated by the arrow D, said direction being clockwise, as seen in said figure, and which will be hereinafter referred to as the forward direction of rotation.

Means is provided to limit the arc of rotation of the worm wheel 62 to movement from between a "starting" or pre-set point to a final or "blocked" point so as to prevent rotation of said member beyond a certain point. Said arc of rotation is conveniently less than 360°. To this end, the wheel 62 has secured to a side face thereof and for common rotation therewith a blocking member 82. Said member includes a carrier 84 attached to the wheel as by a pair of screws and a double-headed floating bumper rod 86 shiftable in a through bore in said carrier. The length of the rod is perpendicular to a radius extending from the shaft 64. A coil spring 88 encircles the rod and is located so as to urge the rod in one axial direction with respect to the carrier, this direction being the same as the forward direction of rotation D of the worm wheel 62. A stop 90 is located in the rotative path of travel of the blocking member 82, said stop constituting a portion of a yoke soon to be described. Rotation of the worm wheel 62 in the forward direction D as a result of forward movement of the shopping cart is permitted until the forward bumper head of the blocking member abuts the upper face of said stop 90. Rotation of the worm wheel 62 in the rearward direction, opposed to direction D, is also limited by abutment of the opposite head of the blocking member with the lower face of the stop 90, this position being illustrated in FIGS. 2, 3 and 4. Accordingly, the arc of rotation of the worm wheel is 360°, minus the arc between the faces of the stop 90 minus the length of the rod plus the amount the rod shifts.

The bumper head of the rod 86 is spring loaded in the direction of movement D so that when it strikes the stop 90, the spring 88 opposes further forward movement of the cart. This prevents abrupt stoppage of the worm wheel 62 so that, as will subsequently be seen, when the shopping cart wheel 52 has been rolled a certain distance, the cart is gradually slowed before it is blocked by the rear end of the head abutting the carrier 84 and the shopper will not be caused to stumble by an abrupt blocking of the cart rear wheel.

Means is provided to selectively change the anti-theft device from a limited distance traversing mode, sometimes herein referred to as an engaged mode to a free-wheeling mode. By the "engaged mode" is meant a condition in which the shopping cart wheel 52 is drivingly engaged to and causes rotation of the worm wheel 62; by the free-wheeling mode" is meant a condition in which the worm wheel 61 is disengaged from the worm gear 80 and consequently the rear wheel 52 is operatively disengaged from the worm wheel. It will be appreciated that in this latter condition, the shopping cart drive terminates at said worm gear 80 so that the wheel 52, and consequently the shopping cart, may be rolled both in a forward and a rearward direction without linear limitation. Said means, which may be appropriately referred to as disengaging or cluch means, is carried by a pair of opposed support plates 92, 94, the support plate 92 being secured to the interior face of the left side wall 30 and the support plate 94 being secured to the interior face of the right side wall 28. Each of these plates has a transversely elongated slot, respectively, 96, 98 therein, the slots being in transverse registry. Each of the slots 96, 98 receives (and permits sliding movement of) the outer end 68 of a different bearing 66, the rectangular cross-section of the end preventing rotation of the bearing but permitting the bearing to slide along its associated slot. The disengaging means includes a yoke 100 which has a pair of arms 102, 104, the arm 102 being secured to the left bearing 66 and the arm 104 being secured to the right bearing 66. A reach 106 connects the arms and a handle 108 extends horizontally forwardly from the reach. Pins 110 fix the arm 104 to the reach 106 to facilitate mounting of the yoke. When the yoke 100 is pulled forwardly by its handle 108, the bearings likewise will be pulled forwardly, the ends thereof sliding in the slots 96, 98. The bearings will carry with them the worm wheel 62 so as to pull said wheel out of engagement with the worm gear 80. Once the worm wheel is out of said engagement, the free-wheeling mode of my anti-theft device prevails.

Means is provided to bias the anti-theft device into its engaged mode. Said means comprises a pair of opposed compression coil spring assemblies 112, each assembly being fixed to a different support plate 92, 94 and each operating upon a different bearing 66. Each assembly is supported at one end by a carrier 114 fixed to its associated support plate and includes an anchor pin 116 fixed to the affiliated bearing 66 and an anchor pin 118 fixed to the carrier 114, the anchor pins 116, 118 being in axial alignment. A coil spring 120 in each assembly has its ends supported by the anchor pins and urges the bearing with which it is associated, and consequently the worm wheel 62, towards and into driving engagement with the worm gear 80.

Means further is provided to selectively hold the worm wheel in its disengaged or free-wheeling mode against the restoring force of the coil spring assemblies 112. To this end, the handle 108 of the yoke 100 has a transverse through bore 122. When the handle 108 is moved forwardly in the direction indicated by the arrow A in FIGS. 2 and 3 the through bore 122 moves forwardly into alignment with a transversely disposed spring loaded bolt assembly 124. The bolt assembly 124 is mounted on the support plate 94 and includes a sleeve 126 (see FIG. 4) having one end fixed to the support plate. The sleeve has a central bore 128. An elongated bolt 130 is shiftable within the bore 128 and has a tapered tip 132 of a diameter slightly less than the bore 122 and which is insertable into said bore when said bore is in alignment therewith. A collar 134 fixed centrally on the bolt 130 holds a coil spring 136 encircling the sleeve 126 under compression against the plate 94. The spring urges the collar 134, and consequently the bolt 130, into the through bore 122 when the bore is in alignment with the bolt. A lever 138 is pivoted centrally on a support 140 which protrudes inwardly from the support plate 94. The lower end of the lever 130 includes a fork 142 which engages a pin 144 fixed to the bolt 130. Rotation of the upper portion of the lever 138 in the direction indicated by the arrow E as shown in FIG. 4 will retract the bolt 130 against the force of the coil spring 136 out of the through bore 122.

Means is provided to allow a clerk at a retail outlet check-out counter to actuate the anti-theft device. To this purpose a guide 146 is fixed to the inside face of the top wall 26 and includes a through bore 148 which runs from a funnel 150 and which is aligned with an opening 152 in the housing in its said top wall 26. The opening 152, funnel 150 and bore 148 are in axial alignment with a portion of the upper end of the lever 138 so that when an elongated small diameter instrument, e.g. an elongated rod, is pushed into the guide, the end of the rod will contact the said portion of the lever and further movement of the rod will push the lever in the direction indicated by the arrow E which will consequently operate the lever to withdraw the bolt tip 132 from the bore 122 in the yoke handle 108.

Means is provided to facilitate the disengagement of the worm wheel 62 from the worm gear 80. Said means comprises a vertically elongated lever 154 (see FIG. 2) having a horizontal handle 156 fixed to its top end. The lever 154 is pivotally mounted on the support plate 92 for rotation about a horizontal axis, said mounting including a headed shaft 158 which rotatably engages the central portion of the lever 154 to a support 160 fixed to said support plate. The lower end of the lever 154 includes a fork 162 which engages a pin 164 extending transversely from the yoke handle 108. When the handle 156 of the lever 154 is pushed in the direction indicated by the arrow F in FIG. 2, the lower end of the lever pulls the yoke, and consequently the worm wheel 62, in the direction indicated by the arrow A in said figure and out of engagement with the worm gear 80.

There is further provided means permitting the worm wheel to rotate only in one direction when engaged to the worm gear 80, this being the forward direction as indicated by the arrow D of FIG. 2. To this end, a pawl 166 (see FIGS. 2 and 3) is pivoted on a pin 167 for rotation about a horizontal axis on a bracket 168 fixed to the support plate 94. A ratchet wheel 170 coaxial with the worm wheel 62 is mounted on the shaft 64 for said wheel for common rotation therewith. A torsion coil spring 172 is wound about the pin 167 and urges the toe of the pawl into engagement with the buttress teeth of the ratchet wheel 170. Said toe and said teeth are so mutually shaped so that the wheel 170 can rotate past the pawl only in the forward direction as shown by the arrow D and rotation of the wheel in the opposed direction is blocked by the pawl. It should be noted at this point that when the worm wheel 62 is withdrawn from engagement with the worm gear 80, the ratchet wheel 170 simultaneously moves away from and therefore is not acted upon by the pawl 166 so that at such time the worm wheel is free to turn in both directions.

Means is provided to rotate the worm wheel 62 to an initial or starting position whenever said wheel is disengaged from the worm gear 80. Said means comprises a large diameter torsion coil spring 174 wound about one end of the shaft 64 for the worm wheel with one end 176 fixed to said worm wheel and the other end 178 fixed to the arm 102 of the yoke 100. The spring 174 is under torsional stress at the start of a distance measuring cycle, such stress being in a direction which, were it not for abutment of the rod 86 against the undersurface of the stop 90, would turn the wheel 62 in a counterclockwise direction as viewed in FIG. 2. This torsional stress is increased when the worm wheel is rotated in the direction indicated by the arrow D of FIG. 2. When the worm wheel is disengaged from the worm gear, said torsion spring partially unwinds and counterrotates the worm wheel until the rearward head of the blocking member 82 contacts the under surface of the stop 90.

Turning then to the operation of the anti-theft device 22, the same being mounted on a shopping cart 10, the anti-theft device is illustrated in its initial position in the figures of the drawings. In said initial position, the device is at the start of its engaged (limited distance traversing) mode, that is, the worm wheel 62 is drivingly engaged to the worm gear 80; the blocking member 82 is located with its rear head abutting the stop 90 and the pawl 166 engages the ratchet wheel 170. As the shopper now rolls the shopping cart, for example, in a parking lot adjacent a supermarket, the rear wheel 52 of the shopping cart rotates and therefore the gear train (that is, the bevel gear 70, the bevel gear 72, the shaft 74, and the worm gear 80) rotates the worm wheel 62 in a forward direction as indicated by the arrow D and at an angular speed considerably slower, in the illustrated embodiment at one four-hundredth the rate, than that of the rear wheel. The pawl 166 permits such rotation of the worm wheel. The worm wheel is rotated by rotation of the wheel 52 until the forward head of the blocking member 82 strikes the stop 90, after which the rear wheel can no longer rotate forwardly with ease, i.e. it is checked. The rotation of the worm wheel has also increased the torsional stress in the spring 174. The various gear ratios and the diameter of the worm wheel 62 are chosen so that the shopping cart has, preferably, a run of a few, e.g., two hundred, feet in excess of the maximum distance a cart should be wheeled from the initial position to a most remotely located automobile in a parking field. Different pairs of bevel gears and worm wheels and gears are selected for any given size of driving cart wheel to match any cart to a specific parking area. The pawl 166 prevents counter-rotation of the worm wheel 62 so that the rear wheel 52 cannot be rolled in an opposite direction. As has been mentioned earlier, the blocking member 82 is spring loaded so that when it strikes the stop 90 a gradually increasing checking force is applied before the cart is blocked from any further forward movement whatsoever. Thus the shopper will not be harmed due to sudden stopping of the shopping cart. Before the shopping cart is blocked, the well intentioned shopper should have had sufficient time to unload his groceries into his automobile, but the unscrupulous shopper will be prevented from removing the shopping cart from the parking lot.

An employee of the retail outlet assigned to this task will have in his possession a key which can be inserted into the lock 50 and which will permit him to open the panel 46 and thereby gain access to the interior of the anti-theft device. The employee grasps the handle 156 and pulls it in the direction indicated by the arrow F of FIG. 2 thereby operating the lever 154 to pull the yoke 100 in the direction indicated by the arrow A and consequently moving the worm wheel 62 out of engagement with the worm gear 80. Such movement of the lever must be with sufficient force to overcome the force of and to compress the coil springs 120. By doing so, the ratchet wheel 170 is moved out of contact with the pawl 166. At this moment, due to the disengagement of the wheel 62 from the gear 80, the device is brought to a free-wheeling mode, that is, the rear wheel 52 of the shopping cart may rotate in either direction without limitation.

The device is locked into its free-wheeling mode as the bore 122 in the handle 108 of the yoke 100 travels far enough so that the bolt assembly 124 can bias the tip 132 of the bolt 130 into said bore. The movement of said tip into the bore holds the worm wheel 62 in its disengaged position, against the force of the coil spring assemblies 112.

As soon as the teeth of the worm wheel 62 are disengaged from the convolutions of the worm gear 80 and the teeth of the ratchet wheel 170 are disengaged from the toe of the pawl 166, the torsion spring 174 is free to act upon and to counter-rotate the worm wheel until the rear head of the blocking member 82 contacts the under surface of the stop 90. The retail outlet employee may now relock the panel 46 and roll the shopping cart back into the retail outlet. Thereafter, shoppers may roll the shpping cart forwardly or rearwardly on the premises without linear limitation.

When the shopper has filled his cart with such merchandise as he wishes to buy, he will then take the shopping cart, as he normally does, to a clerk at a checkout counter and pay for his goods. The checkout clerk will then take a slender instrument and insert it through the opening 152 in the top wall 26 of the housing 24 and exert a sufficient thrust on the instrument so as to operate the lever 138 in the direction indicated by the arrow E in FIG. 4, causing the lever to swing and withdraw the bolt 130 from the bore 122 in the yoke handle 108 against the force of the spring 136. Removal of said bolt permits the coil springs 120 to urge the bearings 66, and consequently the worm wheel 62, into engagement with the worm gear 80. Thereafter, rotation of the wheel 52 of the shopping cart will rotate the worm wheel 62, starting the cycle again.

To prevent an unscrupulous shopper from overcoming the effect of our device, an anti-tilt mechanism is mounted on the shopping cart which will prevent said shopper from tilting the cart so as to remove the rear wheel 52 from contact with the ground and rolling the cart on any of the remaining wheels. To this end, a U-shaped tubular member 180 (see FIG. 1) is fixed to the frame 14 at a location forward of yet adjacent to the front set of wheels 18. The member includes a central reach 182 which is horizontal, extends transversely of the cart, and which is only slightly above ground level. The reach 182 is held in this position by a pair of dependent arms 184, 186. Accordingly, if the cart is tilted so that a shopper trys to roll it on its front two wheels, the reach 182 will contact the ground and prevent the rolling of the cart in such tilted position. Further, as seen in FIG. 5, adjacent the second rear wheel 52' of the rear pair of wheels and located outwardly thereof, we attach a vertical member 188 having its upper end fixed to the bracket 54' which mounts the wheel 52'. The member 188 has its lower end located slightly above ground level so that if the shopping cart is tilted toward its left side (the side opposite to that on which the wheel 52 is located), said lower end will abut the ground and rolling of the shopping cart at such a tilt will be impossible. Although there has been shown one anti-tilt member forward of and between the front wheels of the cart and another anti-tilt member to the side of and between the front wheel which is diagonally opposed to the driving rear wheel 52 and the other rear wheel, the anti-tilt mechanism will work, but less effetcively, with only one of said members.

In FIG. 1a there is illustrated another embodiment of our invention wherein the anti-theft device 22' of the present invention is located on the left side of the shopping cart 10. In this form, the aperture 152' leads through a guide to the latch means and is located in the side wall 28' of the housing where it is particularly accessible to an operator at the checkout counter. The configuration of the operating lever for the latch means is readily altered so that it can be manipulated by a slender instrument inserted in the aperture 152' by said operator.

Within the scope of the invention various modifications may be made. Thus, for the distance measuring and blocking means there may be employed an endless chain which carries a blocking member adapted to strike a yieldable stop. A kinematic transmission including a speed reduction means and a clutch drives a sprocket for the chain in a single direction upon rotation of a shopping cart wheel when the clutch is engaged.

In still another form of our invention the rear wheel 52 may be engaged through a mechanical clutch to an elongated torsion spring. While the shopping cart is within the supermarket, the clutch disengages the rear wheel from said torsion spring. As the shopping cart passes by the check-out counter, the clerk operates the mechanical clutch to engage the rear wheel to the spring so that rotation of said rear wheel winds up the spring until the rear wheel can wind it up no further. Subsequently, a clerk gathering up the carts opens a key controlled door and disengages the clutch.

In yet another form of our invention shown in FIG. 6 the rear wheel 52 operates a piston and cylinder air pump 200. The high pressure side of the pump leads to a small tank 202. While the shopping cart is inside the shopping market, the tank is open through a valve 204 as shown in dotted lines to atmosphere so that reciprocation of the piston may continue unhindered. As the shopping cart passes by the check-out counter, the clerk closes the valve as shown in solid lines so that thereafter as the rear wheel causes the piston to reciprocate, a back-pressure is built up within the tank so that after a time it prevents further rotation of said rear wheel. Subsequently, a clerk gathering up the carts opens a key controlled door 206 and opens the valve.

It thus will be seen that there have been provided anti-theft devices for shopping carts which achieve the several objects of the invention and which are well adapted to meet the conditions of practical use.

As various possible embodiments might be made of the above invention, and as various changes might be made in the embodiments set forth, it is to be understood that all matter herein described or shown in the accompanying drawings is to be interpreted as illustrative and not in a limiting sense.

Having thus described the invention, there is claimed as new and useful, and desired to be secured by Letters Patent:

1. An anti-theft device for a shopping cart including a frame, a basket fixed to the frame and roll-about wheels mounted on the frame, said device comprising a member movable through a predetermined path of travel, transmission reduction means operatively driven by a wheel of the shopping cart and driving said movable member in a single direction so that rotation of said wheel drives the movable member in a predetermined direction along its path of travel and so that the travel of the wheel is reduced to a smaller travel of the movable member, a stop in the path of travel of the movable member so that when the stop is contacted by the movable member the movable member is blocked from further movement in said predetermined direction and the travel of said cart is thereby limited, means to prevent movement of the movable member in a direction corresponding to reverse movement of the cart, and means selectively disengaging the transmission means to convert the device to a free-wheeling distance-unlimited mode.

2. An anti-theft device for a shopping cart as set forth in claim 1 wherein the movable member travels from an initial position to a blocked position and a spring loaded bumper is interposed between the stop and the movable member so that the spring thereof will cushion the impact between the stop and the movable member immediately before movement of the shopping cart is blocked.

3. An anti-theft device for a shopping cart as set forth in claim 2 wherein the device includes a housing fixed to the cart, the movable member is rotatably mounted in the housing and the transmission reduction means rotates the movable member, the movable member carrying the bumper and the stop being located in the rotative path of travel of said bumper.

4. An anti-theft device for a shopping cart as set forth in claim 3 wherein the transmission means includes a driving member that drivingly engages the movable member and the disengaging means moves the movable member and the driving member relatively so as to disengage said members from one another.

5. An anti-theft device for a shopping cart as set forth in claim 4 wherein the driving member is a worm gear, the movable member is a worm wheel and the disengaging means comprises means for moving the worm wheel away from the worm gear.

6. An anti-theft device for a shopping cart as set forth in claim 4 wherein means biases the movable member and the driving member into mutual engagement.

7. An anti-theft device for a shopping cart as set forth in claim 6 wherein manually operable latch means is movable between a first position holding the movable member and the driving member disengaged against the force of the biasing means and a second position permitting the biasing means to mutually engage the movable member and the driving member.

8. An anti-theft device for a shopping cart as set forth in claim 7 wherein means is provided to move the latch means from its first position to its second position, said last-named means including an operator located within the housing and a guide defining an opening passing from the exterior to the interior of the housing, said opening being in operational alignment with said operator and arranged to pass therethrough a slender elongated instrument whereby an employee of a retail outlet utilizing said shopping cart may manually manipulate the latch means by insertion of the slender instrument through said opening so as to engage said operator.

9. An anti-theft device for a shopping cart as set forth in claim 3 wherein means biases the movable member for counter-rotative movement from its block position to its initial position.

10. An anti-theft device for a shopping cart as set forth in claim 3 wherein the means preventing reverse movement of the movable member includes a one-way rotation pawl and a ratchet.

11. An anti-theft device for a shopping cart as set forth in claim 2 wherein the shopping cart is further characterized in that it is rectangular in plane and includes a pair of front wheels and a pair of rear wheels, one wheel being mounted at each corner of the cart on the lower periphery thereof, the transmission means being driven by a rear wheel, and wherein anti-tilt means prevents rolling of the cart if the cart is tilted so that said rear wheel is elevated off the ground and the cart is attempted to be rolled on any of its other wheels, said anti-tilt means comprising a member mounted on the frame on a side remote from said driving rear wheel and having a lower end slightly above ground level.

12. An anti-theft device for a shopping cart as set forth in claim 11 wherein the anti-tilt means includes a member located forward of and between the front wheels and a member located on the side of the other rear wheel.

13. An anti-theft device for a shopping cart as set forth in claim 2 wherein the device includes a housing, the disengaging means is manually operable and is located within the housing, the housing including a lockable access panel only through which said disengaging means may be reached by an employee of a retail outlet utilizing said shopping cart.

14. An anti-theft device for a shopping cart as set forth in claim 2 wherein the shopping cart is further characterized in that the basket is forwardly tapering and is nestable within another similar cart, wherein a housing encloses the transmission means and wherein the transmission means is driven by a rear wheel and the housing is located at a rear portion of the side of the shopping cart so that said housing does not prevent the nesting of the shopping cart to which it is fixed.

15. An anti-theft device for a shopping cart as set forth in claim 2 wherein the disengaging means includes a mechanical clutch.

16. An anti-theft device for a shopping cart as set forth in claim 2 wherein resetting means moves the movable member from its blocked position to its initial position upon operation of the disengaging means.

17. An anti-theft device for a shopping cart as set forth in claim 1 wherein the device includes a housing fixed to the cart, said housing enclosing the remainder of the device and permitting only selective access thereto, the movable member is rotatably mounted in the housing and rotates from an initial position to a blocked position, a spring loaded bumper is interposed between the stop and the movable member so that the spring thereof will cushion the impact between the stop and the movable member immediately before movement of the movable member to its blocked position, the transmission means includes a driving member that engages and rotates the movable member from its initial position to its blocked position, the disengaging means moves the movable member and the driving member apart from one another so as to disengage said members from one another, means biases the movable member and the driving member from disengagement into engagement, manually operable latch means is movable between a first position holding the movable member and the driving member in disengagement against the force of the biasing means and a second position permitting the biasing means to act on said members, a manually operable instrument moves the latch means from its first position to its second position, access to said last-named means being had from the exterior of the housing, resetting means biases the movable member for counter-rotative movement from its blocked position to its initial position upon operation of the disengaging means and anti-tilt means prevents rolling of the cart if the cart is tilted so that the driving wheel is elevated off the ground and the cart is attempted to be rolled on others of is wheels.

18. An anti-theft device for a shopping cart including a frame, a basket fixed to the frame and roll-about wheels mounted on the frame, said device including a movable distance-measuring member constituting a piston and cylinder pump, means operably engaged to a wheel of the cart and actuating said member as the wheel rotates in a forward direction, means constituting a tank connected to the high pressure side of the pump for yieldably preventing further movement of said member when the cart wheel has traversed a predetermined distance and means comprising a valve selectively connecting the tank to atmosphere to selectively render said last-named means ineffective upon opening of the valve.

References Cited
UNITED STATES PATENTS

| 1,539,498 | 5/1925 | Marenna | 188—31 X |
| 3,002,370 | 10/1961 | La Brie | 280—33.99 X |
| 3,201,139 | 8/1965 | Turlington | 280—33.99 |
| 3,272,529 | 9/1966 | Martin | 280—33.99 |

BENJAMIN HERSH, *Primary Examiner.*

MILTON L. SMITH, *Assistant Examiner.*